United States Patent
Cheng

(10) Patent No.: US 8,168,103 B2
(45) Date of Patent: May 1, 2012

(54) METHOD FOR MAKING MUSHROOM-TYPE HOOK STRAP AND MUSHROOM-TYPE HOOK STRAP MADE THEREBY

(75) Inventor: Sen Mei Cheng, Chang Hwa Hsien (TW)

(73) Assignee: Taiwan Paiho Limited, Chang Hwa Hsien (TW)

( * ) Notice: Subject to any disclaimer, the term of this patent is extended or adjusted under 35 U.S.C. 154(b) by 91 days.

(21) Appl. No.: 12/288,789

(22) Filed: Oct. 23, 2008

(65) Prior Publication Data

US 2010/0101056 A1    Apr. 29, 2010

(51) Int. Cl.
*B29C 41/26* (2006.01)
(52) U.S. Cl. .............. 264/167; 264/210.2; 264/211.13
(58) Field of Classification Search ............ 264/167, 264/210.2, 211.13
See application file for complete search history.

(56) References Cited

U.S. PATENT DOCUMENTS

| | | | |
|---|---|---|---|
| 3,758,657 A * | 9/1973 | Menzin et al. | 264/166 |
| 5,781,969 A * | 7/1998 | Akeno et al. | 24/452 |
| 5,913,482 A * | 6/1999 | Akeno | 24/452 |
| 5,951,931 A | 9/1999 | Murasaki et al. | |
| 6,127,018 A * | 10/2000 | Akeno et al. | 428/100 |
| 6,132,660 A * | 10/2000 | Kampfer | 264/167 |
| 6,540,497 B1 * | 4/2003 | Fuda et al. | 425/174.2 |
| 6,569,374 B1 * | 5/2003 | Poulakis | 264/447 |
| 6,627,133 B1 * | 9/2003 | Tuma | 264/167 |
| 6,635,212 B1 * | 10/2003 | Melbye et al. | 264/167 |
| 2001/0022409 A1 * | 9/2001 | Parellada et al. | 264/167 |
| 2003/0085492 A1 * | 5/2003 | Schulte | 264/443 |
| 2003/0127769 A1 * | 7/2003 | Clune | 264/167 |
| 2004/0094860 A2 * | 5/2004 | Jens et al. | 264/166 |
| 2004/0134045 A1 * | 7/2004 | Poulakis et al. | 24/442 |

FOREIGN PATENT DOCUMENTS

| | | |
|---|---|---|
| EP | 0897677 | 2/1999 |
| EP | 1759607 | 3/2007 |

* cited by examiner

*Primary Examiner* — Joseph Del Sol
*Assistant Examiner* — Ryan Ochylski
(74) *Attorney, Agent, or Firm* — Dilworth & Barrese, LLP.

(57) ABSTRACT

A method for making a mushroom-type hook strap for mechanical fasteners is disclosed. In a first stage of the method, a hook strap on which a plurality of hook preforms each having a substantially V-shaped free end are integrally molded. Then, in a second stage of the method, the V-shaped free end of each the hook preform is deformed into a polygonal head portion by two calendar rolls so as to form a mushroom-type hook strap that has a higher engaging percentage with the loop strap, has a longer lifetime, and is capable of providing a reliable and all-directional uniform fastening function.

9 Claims, 4 Drawing Sheets

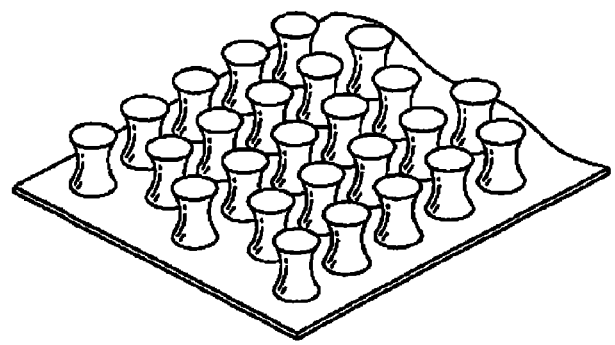
Fig. 2a
PRIOR ART
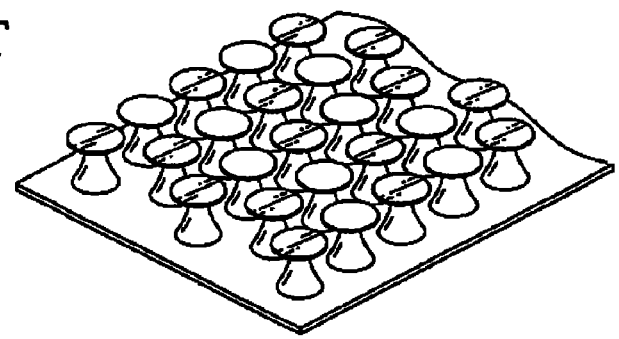
Fig. 2b
PRIOR ART
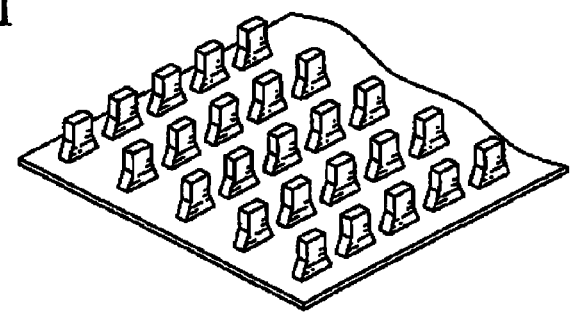
Fig. 3a
PRIOR ART
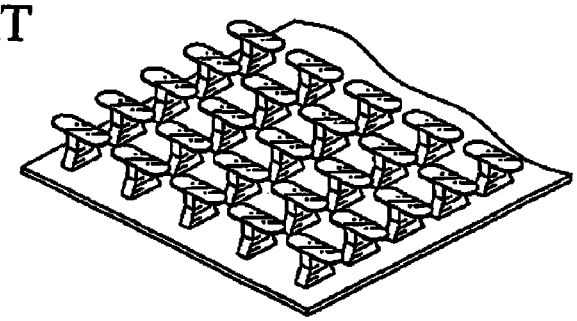
Fig. 3b
PRIOR ART

METHOD FOR MAKING MUSHROOM-TYPE HOOK STRAP AND MUSHROOM-TYPE HOOK STRAP MADE THEREBY

FIELD OF THE INVENTION

The present invention relates generally to a method for making a hook strap for mechanical fasteners, and more specifically to a method for making a mushroom-type hook strap for mechanical fasteners and a mushroom-type hook strap made thereby.

BACKGROUND OF THE INVENTION

A hook-and-loop fastener is a well know fastener type and wildly adapted in a variety of fields that need to fasten two articles together, such as garment, hats/caps, sporting goods, etc. A hook-and-loop fastener mainly consists of a hook strap on which a plurality of plastic hooks are formed and a loop strap on which a plurality of fabric loops are formed and by engaging/disengaging the hooks on the hook strap and the loops on the loop strap, a fastening/unfastening function is provided.

FIGS. 1a and 1b illustrate a method for making a hook strap which generally includes: providing thermoplastic resin 1 into a plastic extruder 2; extruding melted thermoplastic resin 1 from the extruder 2 into a plurality of die cavities 4 formed in an outer periphery of a molding roller 3; cooling the molding roller 3 to form a hook strap 7 on which a plurality of upstanding stems 6 are molded; striping the hook strap off the molding roller 3 by a stripping roller 5; and feeding the hook strap through a nip formed between a pair of shaping rollers and the shaping roller that contacts the stems heats the free end of the stems to a temperature above a flow point of the thermoplastic reason to shape the stems into hooks with desired shape.

FIGS. 2 and 3 illustrate the structure of two existing mushroom-type hook strap respectively, wherein FIG. 2 shows an array of circular-headed mushroom-type hooks (FIG. 2b) that are formed from cylindrical stems (FIG. 2a); and FIG. 3 shows an array of elliptic-headed mushroom-type hooks (FIG. 3b) that are formed from tetragon stems (FIG. 3a). Although these two mushroom types of hooks both may provide certain fastening/unfastening function, they both have their own deficiencies. For instance, when engaging the circular-headed mushroom-type hooks illustrated in FIG. 2 with the fabric loops on the loop strap, the effective engaging percentage is relative low because the smooth periphery of the circular head of the hooks does not provide protruding portions that can engage with the fabric loops, and thus has a drawback of unable to provide sufficient fastening strength. Additionally, circular-headed mushroom-type hooks can provide effective engaging only when the head of the hooks fully inserted into the fabric loops forming a lockup type engagement. However, although this lockup type of engagement may provide a firm engagement, the fabric loops usually will be destroyed by the hooks during a detaching operation between the hook strap and the loop strap, and after several times of engaging/detaching operations the fastening capability will drop sharply or even loosing the fastening capability because the percentage of the loops been destroyed increases as the engaging/detaching operation number increases. As a result, the effective lifetime of this circular-headed mushroom-type hooks is relative short.

Although the ends of the major axis of the elliptic-headed mushroom-type hooks illustrated in FIG. 3 can form effective engagement with the fabric loops and thus can provide higher engagement percentage and larger fastening strength than above-mentioned circular-headed mushroom-type hooks, however, because this type of hooks form effective engagement with the fabric loops only at the ends of the major axis of the elliptic head, the effective fastening strength is provided only in a direction parallel the major axis of the elliptic head. The effective engagement with the loops in a direction perpendicular to the major axis of the elliptic head is much less than in the parallel direction. In other words, the fastening function provided by this type of hook-and-loop fastener is not an all-directional uniform fastening function, but a directional fastening function. Therefore, when the engagement between this type of elliptic-headed mushroom-type hooks and the loops is subjected to an external impact force in a specific direction (such as in a direction perpendicular to the major axis of the elliptic head), an unintentional disengaging may occur and pose a insufficient reliability problem to this type of hooks.

In view of the above-mentioned disadvantages/problems associated with the existing mushroom-type hook strap, there exists a need for a method for making a mushroom-type hook strap which has a higher engaging percentage with the loop strap, has a longer lifetime, and is capable of providing a reliable and all-directional uniform fastening function.

SUMMARY OF THE INVENTION

Accordingly, one object of the present invention is to provide a method for making a mushroom-type hook strap which has a higher engaging percentage with the loop strap, has a longer lifetime, and is capable of providing a reliable and all-directional uniform fastening function. This object may be achieved by a method for making a mushroom-type hook strap for mechanical fasteners. This method includes the steps of:

providing a rotational molding roller, the molding roller having a plurality of substantially Y-shaped molding cavities formed in an outer periphery surface thereof and a cooling device provided therein;

providing an extruder, the extruder having a extruding die disposed imminently close to the outer periphery surface of the rotational molding roller with a gap being formed therebetween;

feeding a thermoplastic material to the extruder and melting the thermoplastic material in the extruder so as to extrude the melted thermoplastic material into the plurality of substantially Y-shaped molding cavities and onto the outer periphery surface of the rotational molding roller through the extruding die;

cooling the thermoplastic material on the outer periphery surface of the rotational molding roller and within the substantially Y-shaped molding cavities with the cooling device so as to form a hook strap on which an plurality of hook prefroms are molded, each preform having a substantially V-shaped free end;

peeling off the hook strap from the molding roller; and feeding the hook strap through a nip formed between a pair of calender rolls, wherein the calendar roll that contacts the V-shaped free end of the hook preforms is heated to a temperature above a plastic deforming temperature of the plastic material so as to deform the V-shaped free end of each hook preform into a polygonal head shape and thereby forming a mushroom type hook having a polygonal head portion.

According to one embodiment of the present invention, the plan containing the two intersected arms of the V-shaped free end of the hook preform is parallel to the direction that the hook strap is fed through the calender rolls.

According to another aspect of the present invention, a mushroom-type hook strap is produced by the method described above.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings, wherein:

FIGS. 2a and 2b are enlarged schematic perspective views showing the structure of one of existing mushroom-type hooks;

FIGS. 3a and 3b are enlarged schematic perspective views showing the structure of another existing mushroom-type hooks;

DETAILED DESCRIPTION OF THE INVENTION

Figure 1A:
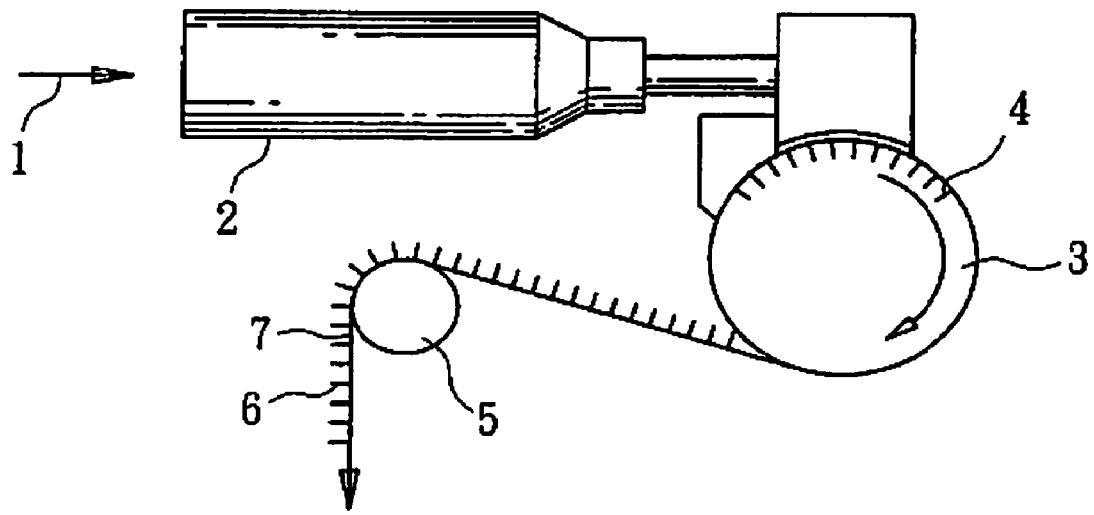
FIGS. 1a and 1b are schematic views illustrating an apparatus form making traditional hook straps.
Figure 1B:
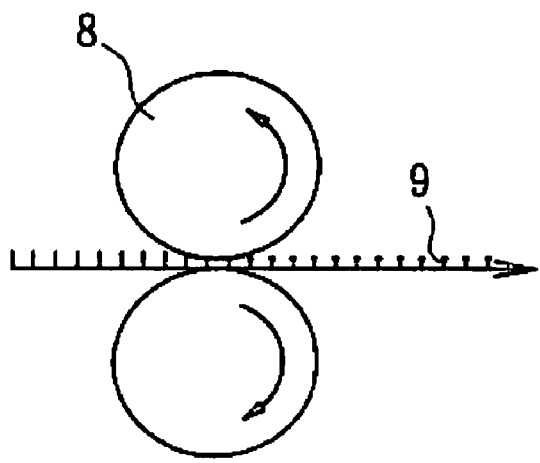
Figure 4:
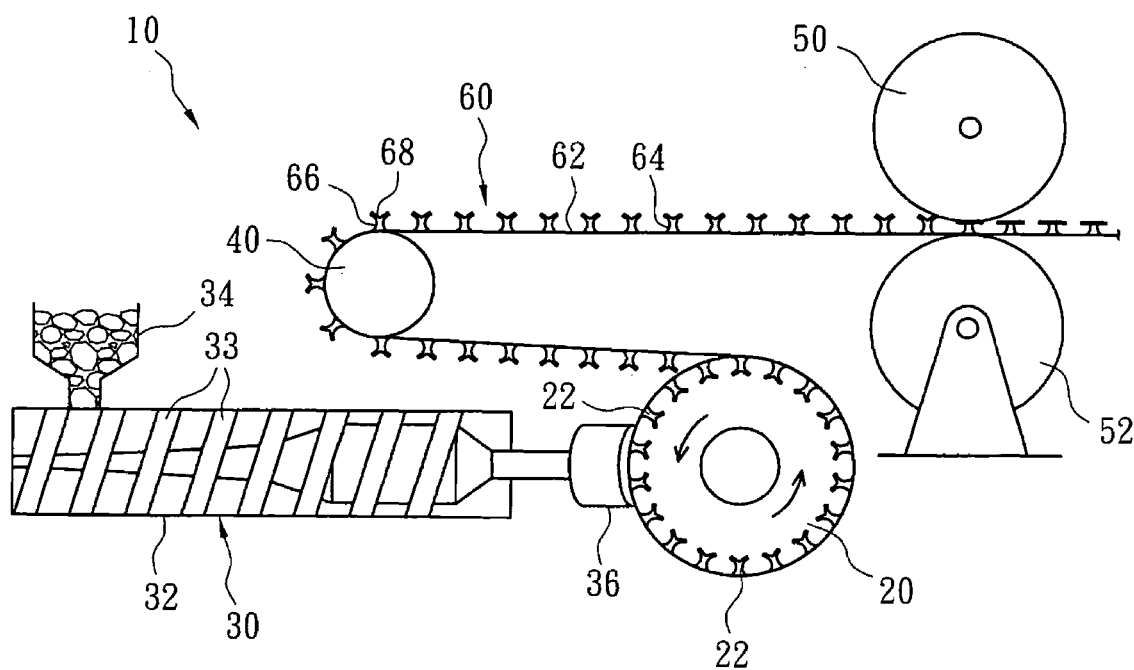
FIG. 4 is a schematic view illustrating an apparatus for making the inventive mushroom-type hook strap according to one embodiment of the present invention.
Figure 5:
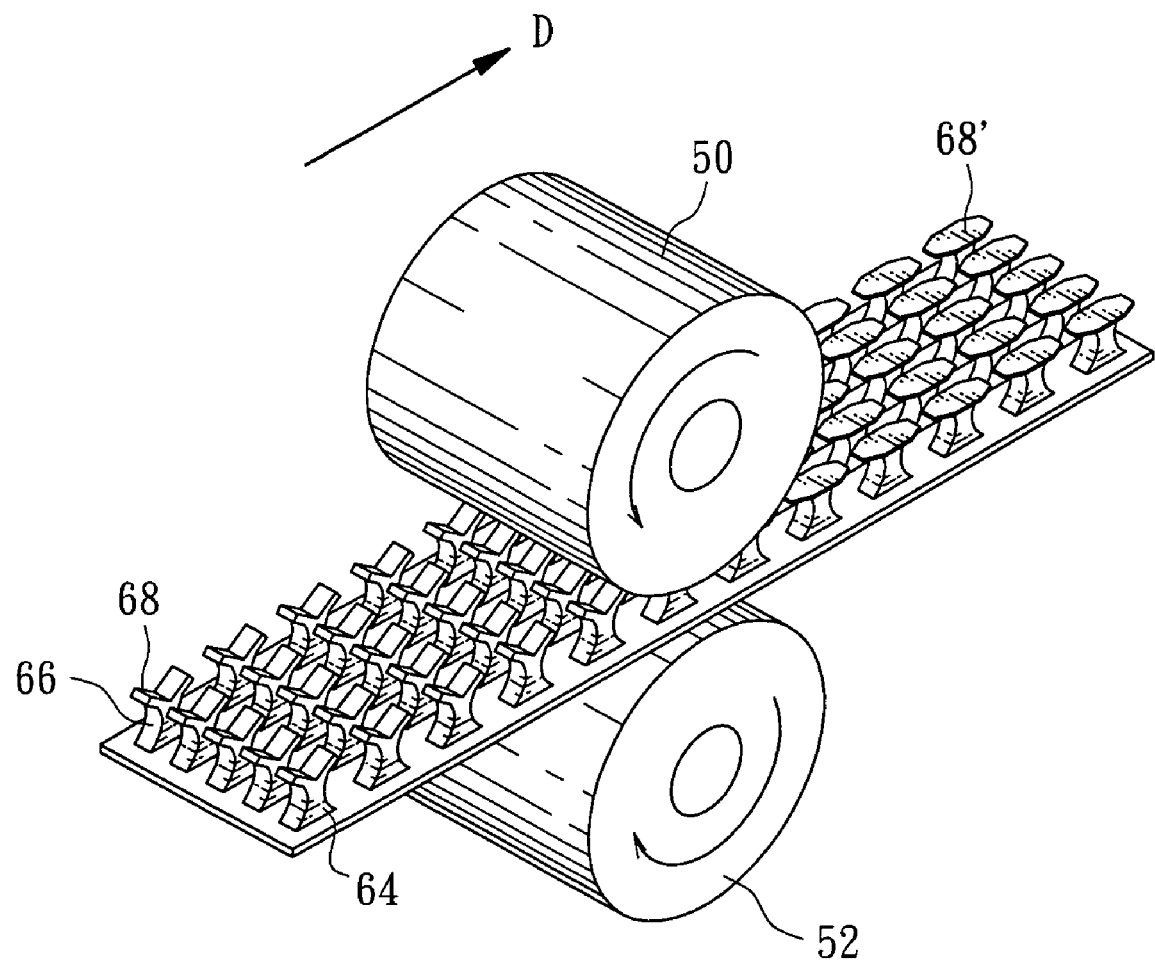
FIG. 5 is an enlarged schematic perspective view showing the structure of the hook preforms before and after being fed through the calendar rolls.

Referring now to FIGS. 4 and 5 in which a preferred embodiment of the method of the present invention and a mushroom-type hook strap made thereby is illustrated to describe the present invention.

FIG. 4 is a schematic view illustrating an apparatus 10 for making the inventive mushroom-type hook strap according to one embodiment of the present invention. The apparatus 10 mainly includes a rotational molding roller 20, an extruder 30, a stripping roll 40 and a pair of calendar rollers 50 and 52. The molding roller 20 has a plurality of substantially Y-shaped molding cavities 22 formed in an outer periphery surface thereof and a cooling device (not shown), such as a cooling water circulating system, provided therein. The extruder 30 includes a melting chamber 32 for melting the plastic material, and the melting chamber 32 is surrounded by heating coils 33. The extruder 30 further includes a feed tank 34 disposed at one end of the melting chamber 32 and an extruding die 36 operationally coupled to the other end of the melting chamber 32. The extruding die 36 is disposed imminently close to the outer periphery surface of the rotational molding roller 20 with a gap being formed therebetween. This gap may be varied by moving the extruding die 36 relative to the outer periphery surface of the rotational molding roller 20.

When executing the inventive method of the present invention, a thermoplastic material (for example, polyethylene) is firstly supplied to the feed tank 34 and through which the thermoplastic material is fed into the extruder 30. The thermoplastic material is melted in the melting chamber 32 by the heating coils 33 (for example, the temperature in the melting chamber is heated up to 235° C.). The melted thermoplastic material is then ejected through the extruding die 36 onto the outer periphery surface of the rotational molding roller 20 and into the plurality of substantially Y-shaped molding cavities 22. After the thermoplastic material that on the outer periphery surface of the rotational molding roller 20 and within the plurality of substantially Y-shaped molding cavities 22 is cooled and solidified by the cooling device of the molding roller 20, it is peeled off from the molding roller 20 by a stripping roll 40 to formed a hook strap 60 and the hook strap 60 includes a backing 62 and a plurality of hook preforms 64 integrally molded on the backing 62. The hook strap 60 is then fed through a nip formed between the calendar rolls 50 and 52.

In the embodiment shown in FIG. 5, each of the preforms 64 is molded into a polygonal peg (such as a tetragon peg as shown in the drawing) and includes a stem portion 66 and a substantially V-shaped free end 68. In addition, in the embodiment shown in FIG. 5, the plane that contains the intersected arms of the V-shaped free end of the hook perform 64 is parallel to a direction D that the hook strap 60 is fed through the calendar rolls 50 and 52.

The calender roll 50 that contacts the V-shaped free ends of the hook preforms 64 is heated to and maintained at a plastic deforming temperature of the thermoplastic material. For example, in the case that polyethylene is used as the thermoplastic material the calender roll 50 is heated to and maintained at 130° C. Additionally, a nip is formed between the calender rolls 50 and 52 and this nip can be adjusted such that the nip is smaller than a sum of the thickness of the backing 62 and the height of the preform 64 and substantially equal to the height of the stem portion 66 of the hook preform 64. Thereby, while being fed through the calender rolls 50 and 52, the V-shaped free end 68 of the preform 64 will be plastically deformed as a polygonal head portion 68', as shown in FIG. 5.

Because the hooks of the hook strap produced by the method of the present invention has a polygonal head portion 68', a number of protruding portions are provided by the head portion 68' to form effective engagement with the loops of a loop strap and a higher engaging percentage can thus be provided. In addition, because the hooks of the hook strap of the present invention engage the loops of a loop strap with the protruding portions of polygonal head portion, no loops will be destroyed during a detaching operation and thus a longer lifetime for the hook strap may be provided. Moreover, the polygonal head portion of the hooks of the hook strap of the present invention provides protruding portions in substantially every direction for engaging the fabric loops of a loop strap and thus the hook strap of the present invention can provide a uniform engaging function in substantially all direction.

Although the present invention has been described above according to the preferred embodiment thereof, this does not mean that the scope of the present invention is limited to specific structure and operation steps described above. In fact, there exist various modifications and variations under the principle and spirit disclosed above. For instance, an auxiliary cooling device, such as a cooling fan, may be disposed relative to the molding roller 20 at a position diametrically opposite to the extruding die 36 to provide extra cooling effect to the hook strap on the outer periphery surface of the molding roller 20.

It will be apparent to people skilled in this art that many modifications can be made to the disclosed structures/steps without departing from the scope of the invention. Therefore, it is the intent of the appended claims to cover all such variations and modifications as come within the sprit and scope of this invention.

What is claimed is:

1. A method for making a mushroom-type hook strap for mechanical fasteners, the method comprising the steps of:

providing a rotational molding roller, the molding roller having a plurality of substantially Y-shaped molding cavities formed in an outer periphery surface thereof and a cooling device provided therein, the Y-shaped molding cavities each having a stem adjacent and opening onto the outer periphery surface and a flared fork at an opposite end of the open stem pointing to an axis of the roller;

providing an extruder, the extruder having a extruding die disposed imminently close to the outer periphery surface of the rotational molding roller with a gap being formed therebetween;

feeding a thermoplastic material to the extruder and melting the thermoplastic material in the extruder to extrude the melted thermoplastic material through a channel within the extruder and extruding die and into the plurality of substantially Y-shaped molding cavities and onto the outer periphery surface of the rotational molding roller through the extruding die;

cooling the thermoplastic material on the outer periphery surface of the rotational molding roller from within the molding roller and within the substantially Y-shaped molding cavities with the cooling device to form a hook strap on which a plurality of Y-shaped hook preforms are molded, each said Y-shaped preform having a substantially flared V-shaped free end;

peeling off the hook strap from the molding roller; and feeding the hook strap through a nip formed between a pair of calender rolls, wherein the calender roll that contacts the V-shaped free end of the hook preforms is heated to a temperature above a plastic deforming temperature of the thermoplastic material to deform the flared V-shaped free end of each hook preform into a single multifaceted head shape situated on top of an axis of a single stem and thereby forming a mushroom type hook having a single multifaceted head portion on the axis of the single stem, the single multifaceted head portion providing protruding portions in substantially every direction for engaging fabric loops of a loop strap.

2. A method for making a mushroom-type hook strap for mechanical fasteners according to claim 1, wherein a plane that contains the two intersected arms of the V-shaped free end of the hook preform is parallel to the direction that the hook strap is fed through the calender rolls.

3. A method for making a mushroom-type hook strap for mechanical fasteners according to claim 1, wherein the gap between the extruding die and the outer periphery surface of the rotational molding roller can be adjusted by moving the extruding die relative to the molding roller.

4. A method for making a mushroom-type hook strap for mechanical fasteners according to claim 1 wherein the peeling off step is performed by a rotational stripping roll.

5. A method for making a mushroom-type hook strap for mechanical fasteners according to claim 1 further comprising the step of providing an auxiliary cooling device outside the molding roller to provide extra cooling to the outer periphery surface of the rotational molding roller.

6. A method for making a mushroom-type hook strap for mechanical fasteners according to claim 1, comprising the additional step of
   adjusting the nip formed between the calender rolls to be smaller than the sum of the thickness of the backing and the height of the preforms of the strap and substantially equal to the height of the stem portion of the preforms.

7. A method for making a mushroom-type hook strap for mechanical fasteners according to claim 1, having substantially uniform engaging force in all directions.

8. A method for making a mushroom-type hook strap for mechanical fasteners according to claim 1, wherein a surface of the single head portion is planar.

9. A method for making a mushroom-type, hook strap for mechanical fasteners according to claim 8, wherein the single, planar head portion extends in a perpendicular direction to the axis of the stem.

\* \* \* \* \*